US00RE40099E

(19) United States
(12) Reissued Patent
Stephens et al.

(10) Patent Number: US RE40,099 E
(45) Date of Reissued Patent: Feb. 26, 2008

(54) LOAD CELL APPARATUS AND METHOD

(75) Inventors: Thomas W. Stephens, Leander, TX (US); Donald R. Zrudsky, Liberty Hill, TX (US)

(73) Assignee: Cranium Corporation, Austin, TX (US)

(21) Appl. No.: 10/685,735

(22) Filed: Oct. 14, 2003

Related U.S. Patent Documents

Reissue of:
(64) Patent No.: 6,303,882
Issued: Oct. 16, 2001
Appl. No.: 09/523,385
Filed: Mar. 10, 2000

(51) Int. Cl.
*G01G 19/14* (2006.01)
*B66C 1/40* (2006.01)

(52) U.S. Cl. ..... 177/147; 177/184; 73/862.56
(58) Field of Classification Search ..... 177/147, 177/154–159, 184–189; 73/862.56
See application file for complete search history.

(56) References Cited

U.S. PATENT DOCUMENTS 2,616,683 A * 11/1952 Le Fevre, Jr. ..... 177/211
3,229,778 A * 1/1966 Schaner ..... 177/147
3,290,931 A * 12/1966 Fowkes et al. ..... 73/862.56
3,315,202 A * 4/1967 Johns et al. ..... 338/5
3,556,237 A * 1/1971 Allison ..... 177/200
3,823,395 A * 7/1974 Rigney et al. ..... 340/531
3,827,514 A * 8/1974 Bradley ..... 177/147
3,911,737 A * 10/1975 Ormond ..... 73/862.629
4,037,469 A * 7/1977 Nordstrom et al. ..... 73/862.56
4,102,295 A * 7/1978 Crook et al. ..... 116/281
4,114,709 A * 9/1978 Jacobs et al. ..... 177/156
4,153,123 A * 5/1979 Bereyziat ..... 177/147
4,379,495 A * 4/1983 Cocks et al. ..... 177/1
4,455,880 A * 6/1984 Naslund ..... 73/862.56
4,523,653 A * 6/1985 Scrivener et al. ..... 177/147
4,553,619 A * 11/1985 Fujinaga ..... 177/185
4,596,297 A * 6/1986 Skibinski ..... 177/132
4,697,798 A * 10/1987 Pitter et al. ..... 267/70
4,932,253 A * 6/1990 McCoy ..... 73/152.61
5,152,183 A * 10/1992 Munzebrock ..... 73/862.56
5,264,666 A * 11/1993 English et al. ..... 177/147
5,429,007 A * 7/1995 Khachaturian et al. 73/862.474

* cited by examiner

*Primary Examiner*—Randy W Gibson
(74) *Attorney, Agent, or Firm*—J. Nevin Shaffer, Jr.

(57) ABSTRACT

A load cell system (10) having a frame (12) to which upper compliance assembly (14) is connected. A load cell (16) is connected to upper compliance assembly (14) and lower compliance assembly (18) is connected to load cell (16). In preferred embodiments, load cell system (10) includes fixed overload limit (26), moving overload limit(28), and anti-rotation device (24). In a still further embodiment, load cell system (10) includes a data transmission and receiver device (65) for transmitting and receiving data to and from load cell (16).

19 Claims, 8 Drawing Sheets

LOAD CELL APPARATUS AND METHOD

Matter enclosed in heavy brackets [ ] appears in the original patent but forms no part of this reissue specification; matter printed in italics indicates the additions made by reissue.

BACKGROUND OF THE INVENTION

This invention relates to an improved load cell apparatus and method. In particular, this invention relates to a load cell apparatus and method for use in harsh industrial environments.

The art of load cells is well developed. The use of load cells to assist in determining the weight of objects placed upon or supported by load cells greatly assists users in the weighing process. A difficulty arises when load cells are used in harsh industrial environments where the sensitive load cells of the prior art are overwhelmed. For example, to date, the use of load cells in the scrap metal industry is essentially non-existent. The reason for this is that both the machines used in the environment, i.e. grappling crane or a magnetic lift, and the materials being lifted i.e. huge pieces of scrap metal, place extraordinary strain on the delicate load cell mechanism.

A drawback to the load cell systems known in the art is that they are not sufficiently robust to be used in extreme environments. Thus, there is a need in the art for providing a load cell apparatus and method which is capable of use in the harshest environment. It, therefore, is an object of this invention to provide an improved load cell apparatus and method capable of withstanding extreme forces of impact and lift and still provide accurate load measurements.

SHORT STATEMENT OF THE INVENTION

Accordingly, the load cell system of the present invention includes a frame to which an upper compliance assembly is connected. A load cell is connected to the upper compliance assembly and a lower compliance assembly is connected to the load cell. In a preferred embodiment, the upper and lower compliance assemblies include a first base, a compression pad, a rebound pad, a load plate located between the rebound and the compression pad, and a second base connected to the rebound pad or the compression pad. In a further embodiment, the load cell includes a load cell yoke connected to the upper assembly and an upper and lower loading saddle connected to the load cell. In a further embodiment, an overload limit is provided. In a preferred embodiment, the overload limit includes a fixed overload limit and a moving overload limit. In a further embodiment, a rotation preventor is provided and in a still further embodiment a data transfer device is provided for providing data to the load cell and for receiving data from the load cell.

A corresponding load cell method for use in a weighing system is set forth hereafter and claimed.

BRIEF DESCRIPTION OF THE DRAWINGS

Other objects, features and advantages of the present invention will become more fully apparent from the following detailed description of the preferred embodiment, the appended claims, and the accompanying drawings in which:

DETAILED DESCRIPTION OF THE PREFERRED EMBODIMENTS

Figure 1:
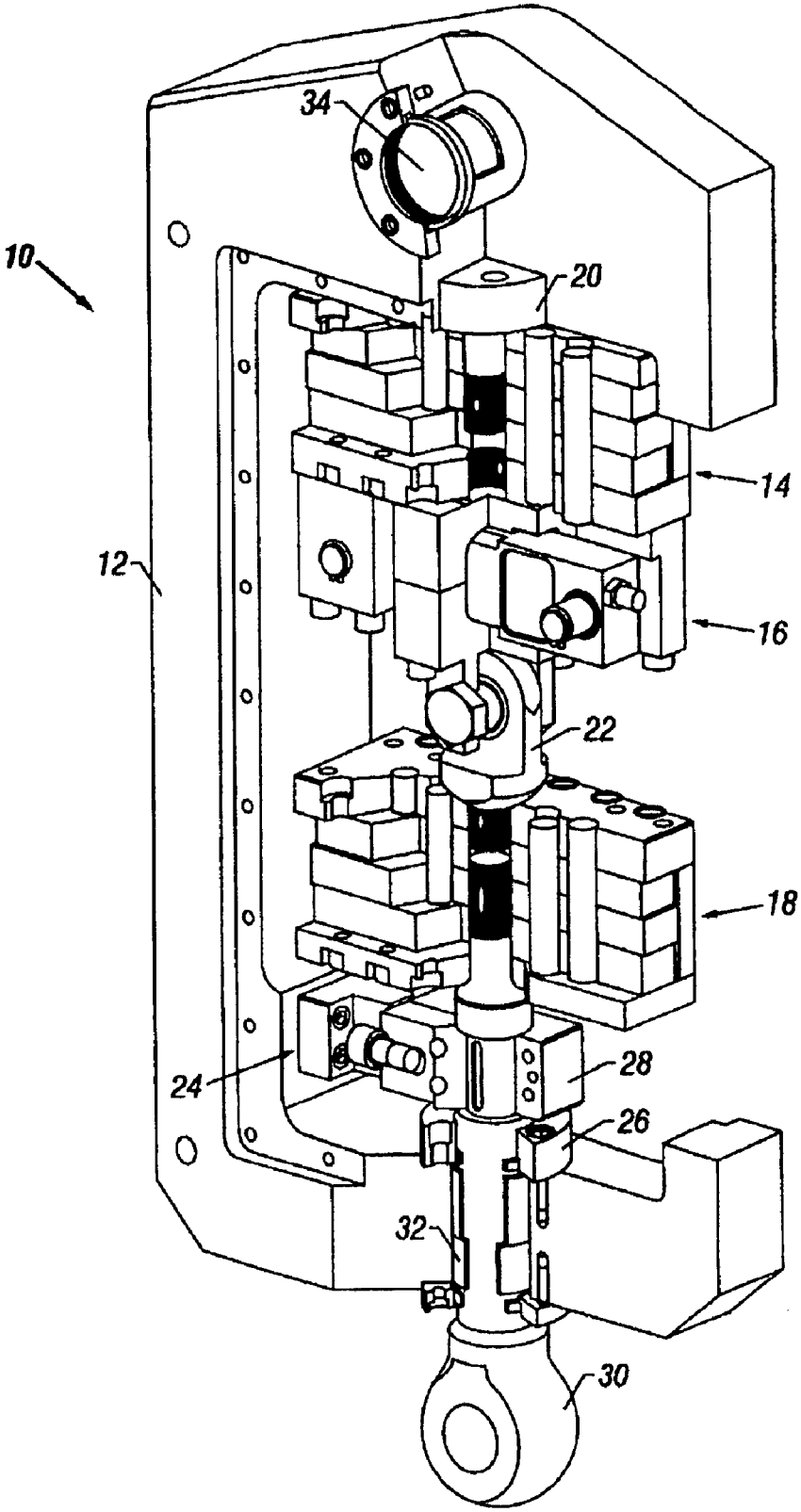
FIG. 1 is a partial section view of the load cell apparatus of the present invention.

The preferred embodiment of the present invention is illustrated by way of example in FIGS. 1–8. With specific reference to FIG. 1, a load cell system 10 includes a frame 12, an upper compliance assembly 14, a load cell 16, and a lower compliance assembly 18.

FIG. 1 also illustrates upper hanger stud 20 connected to upper compliance assembly 14. Also shown is rod end link 22 connected to load cell 16 and to lower compliance assembly 18. Also illustrated are anti-rotation device 24, fixed overload limit 26, and moving overload limit 28.

FIG. 1 also illustrates drawbar 30 and drawbar bearing 32. Finally, cross pin bearing 34 is illustrated which provides two-axis tilt compensating support assembly as more fully described hereafter.

Figure 2:
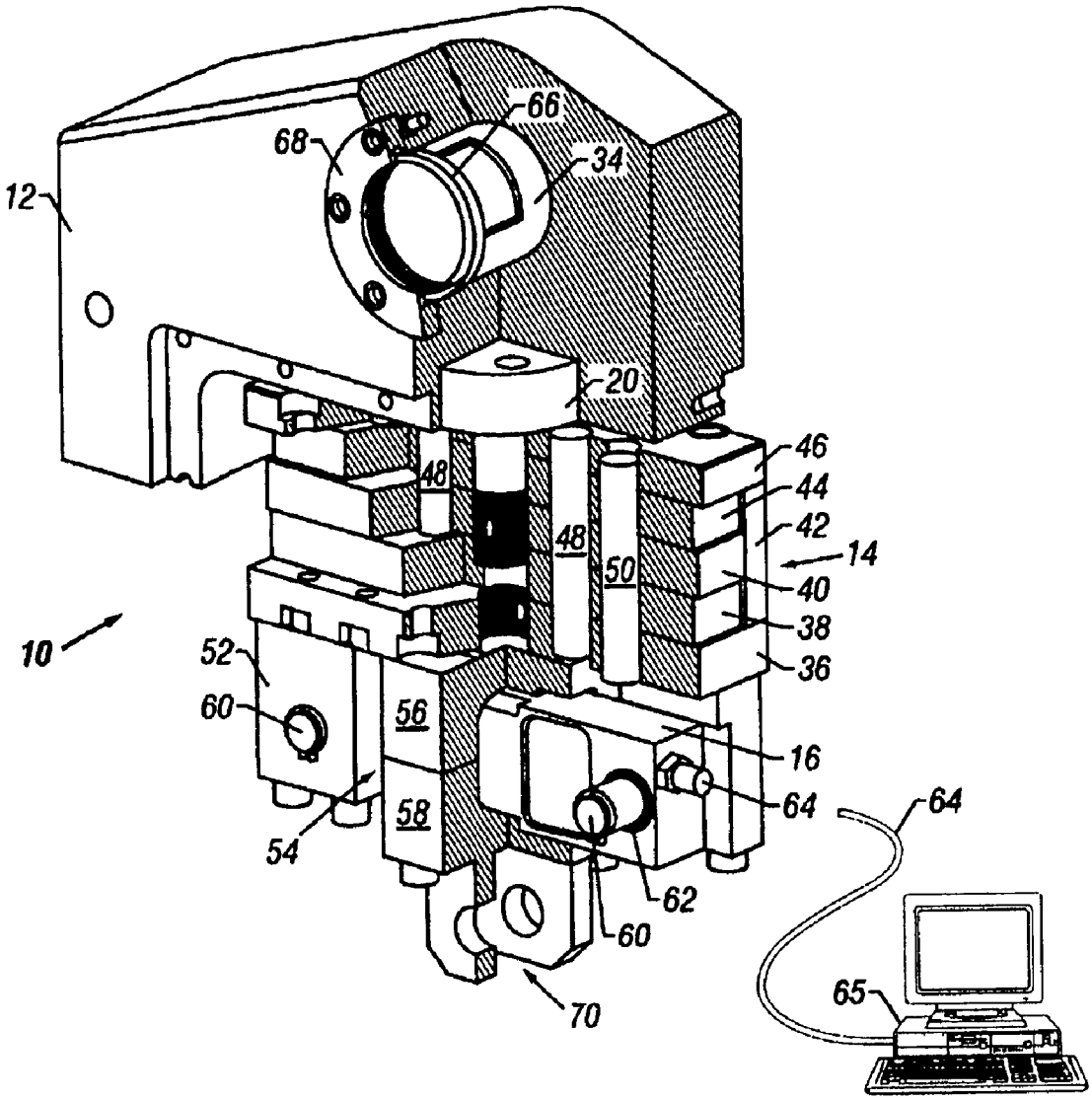
FIG. 2 is a partial section view of the upper detail of the present invention above the rod end link.

Referring now to FIG. 2, the upper detail of load cell system 10 is illustrated. As can clearly be seen, upper hanger stud 20 is connected to upper compliance assembly 14. Upper compliance assembly 14 includes first base 36, rebound pad 38, load plate 40, a pair of side plates 42 (one side plate 42 has been omitted for clarity), compression pad 44, and second base 46. Upper compliance assembly 14 provides an enclosed assembly, therefore, by the combination of first base 36, side plates 42 and second base 46. All of the elements of upper compliance assembly 14 are held together by means of a pair of load plate locating pins 48 and a pair of base locating pins 50. Only one of the pair of base locating pins 50 is shown by way of the partial section view in FIG. 2. Location of load plate 40 with relation to base 36 is by means of four locating pins tightly fitting through the compliant pad material. One pair of pins 48 are press fitted in the load plate 40 and pads 38 and 44 and pass freely without contact through first base 36 and second base 46. A second pair of pins 50 are press fitted in first base 36 and pads 38 and 44 and pass freely without contact through load plate 40.

Partial section view of FIG. 2 also shows load cell 16 and its various accompanying components. In a preferred embodiment, load cell 16 further includes load cell mounting yokes 52. Load cell loading saddle 54 is connected to load cell 16 and to rod end link 22. Load cell loading saddle 54 in a preferred embodiment includes upper load cell loading saddle 56 and lower load cell loading saddle 58.

FIG. 2 also illustrates a pair of load cell mount pins 60, one of four load cell cushion "O" rings 62 and load cell output 64. Load cell output 64 may be of any type now known or hereafter developed. In a preferred embodiment, a hard wire electrical output cord is connected to load cell output 64 and run internally through frame 12 until it can safely exit frame 12 in a manner to avoid harm during activation and use of load cell system 10. Otherwise, load cell output 64, in a preferred embodiment, includes an electronic transmission device whereby the output of load cell 16 is electronically transmitted to a remote receiver thereby eliminating the possibility of breaking the load cell output 64 connection through use of load cell system 10 in a harsh environment.

FIG. 2 also illustrates cross pin bearing 34. Cross pin bearing 34 in a preferred embodiment includes cross pin bearing seal 66 and cross pin bearing seal housing 68. These housings also function as locating faces to a two-axis tilt compensating support assembly 88, discussed more fully hereafter. Load cell 16 may be connected to upper compliance assembly 14 by any means now known or hereafter developed. In a preferred embodiment, upper hanger stud 20 connects upper compliance assembly 14 to frame 12. A pair of load cell mounting yokes 52 connect load cell 16 to upper compliance assembly 14 by a pair of load cell mount pins 60 as illustrated. Load cell 16 is centered within load cell mounting yokes 52 by means of cushion "O" rings 62. Weighing forces are applied to load cell 16 by load cell loading saddle 54 which is connected to the middle of load cell 16.

Figure 3:
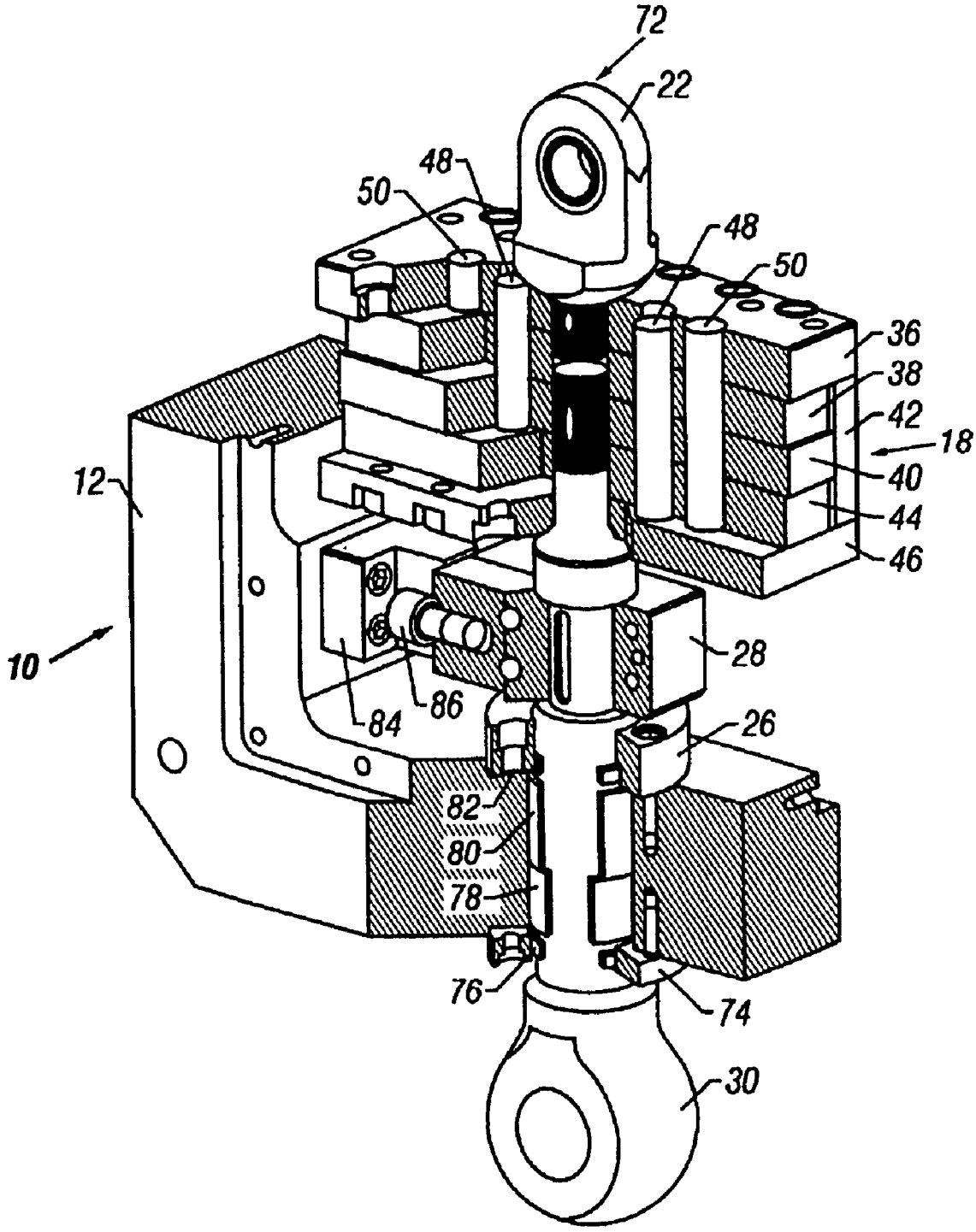
FIG. 3 is a partial section view of the lower detail of the present invention below the rod end link.

FIG. 3 illustrates the lower detail of load cell system 10 of the present invention. Beginning at rod end link 22, lower compliance assembly 18 is illustrated. As with upper compliance assembly 14, lower compliance assembly 18 includes in reverse order, the same elements. That is, from top to bottom, lower compliance assembly 18 includes first base 36, rebound pad 38, load plate 40, compression pad 44, and second base 46. Lower compliance assembly also includes side plates 42. As with the upper compliance assembly 14, the internal components of the lower compliance assembly 18 are located by a pair of load plate loading pins 48 and a pair of base locating pins 50.

Referring to FIGS. 2 and 3, rod end link 22 is shown to be comprised of a female portion 70 connected to the load cell loading saddle 54 and a male portion 72 connected to lower compliance assembly 18. Further, drawbar 30 is shown in detail including lower seal housing 74, drawbar bearing lower seal 76, drawbar bearing 78, drawbar bearing spacer 80 and drawbar bearing upper seal 82.

FIG. 3 also illustrates fixed overload limit 26 and moving overload limit 28 and anti-rotation device 24. In a preferred embodiment, anti-rotation device 24 includes anti-rotation guide 84 and anti-rotation guide bearing 86. Anti-rotation guide 84 in a preferred embodiment is connected, as illustrated, to frame 12 and anti-rotation guide bearing 86 is connected to moving overload limit 28.

Figure 4:
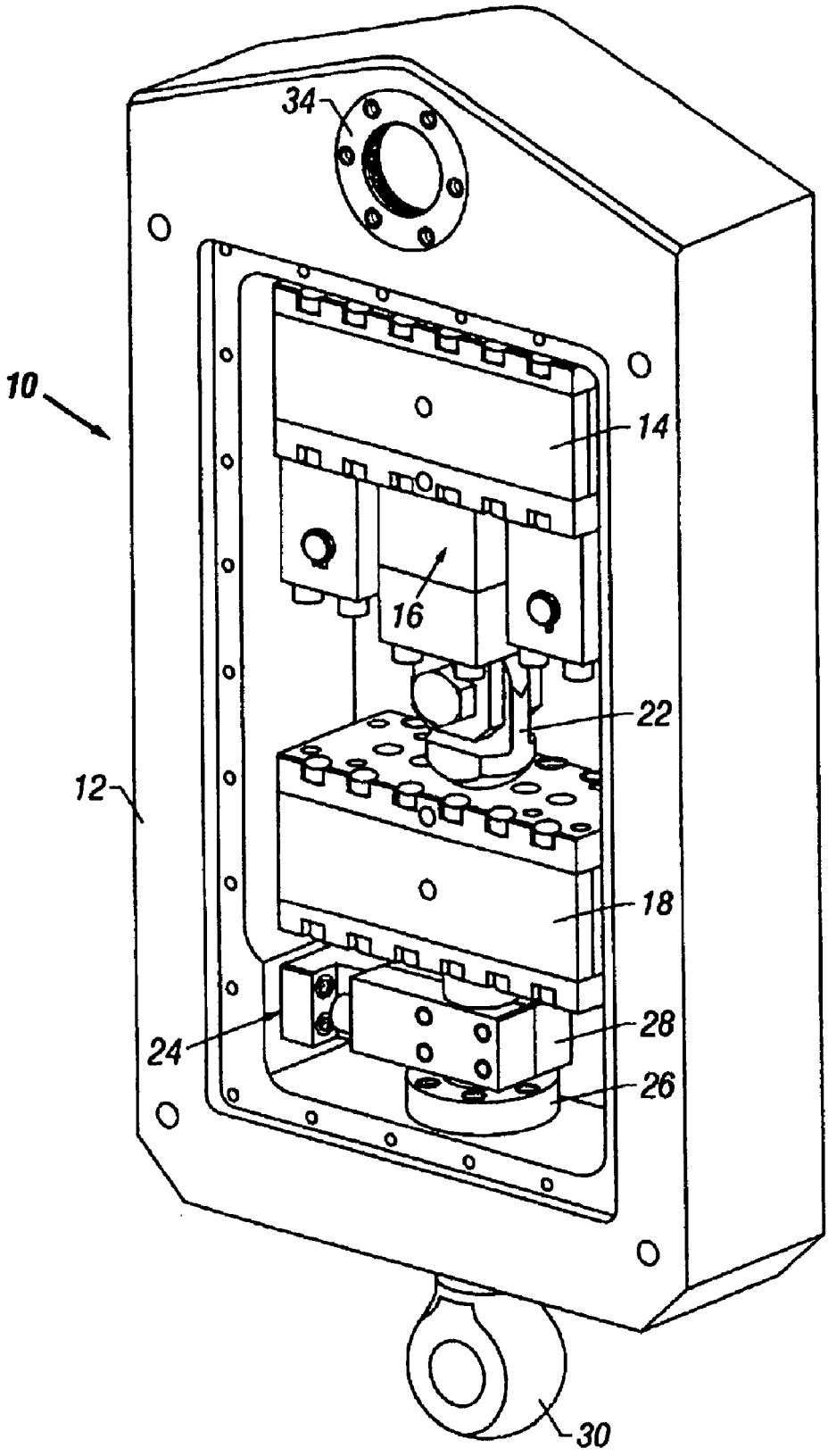
FIG. 4 is an isometric view of the major components of the present invention.

Referring now to FIG. 4, a plan view of the major components of load cell system 10 of the present invention is illustrated. Again, these major elements include frame 12, upper compliance assembly 14, load cell 16, and lower compliance assembly 18. Further, rod end link 22, cross pin bearing 34 and drawbar 30 are illustrated. Likewise, fixed overload limit 26, moving overload limit 28 and anti-rotation guide 84 are shown.

Figure 5:
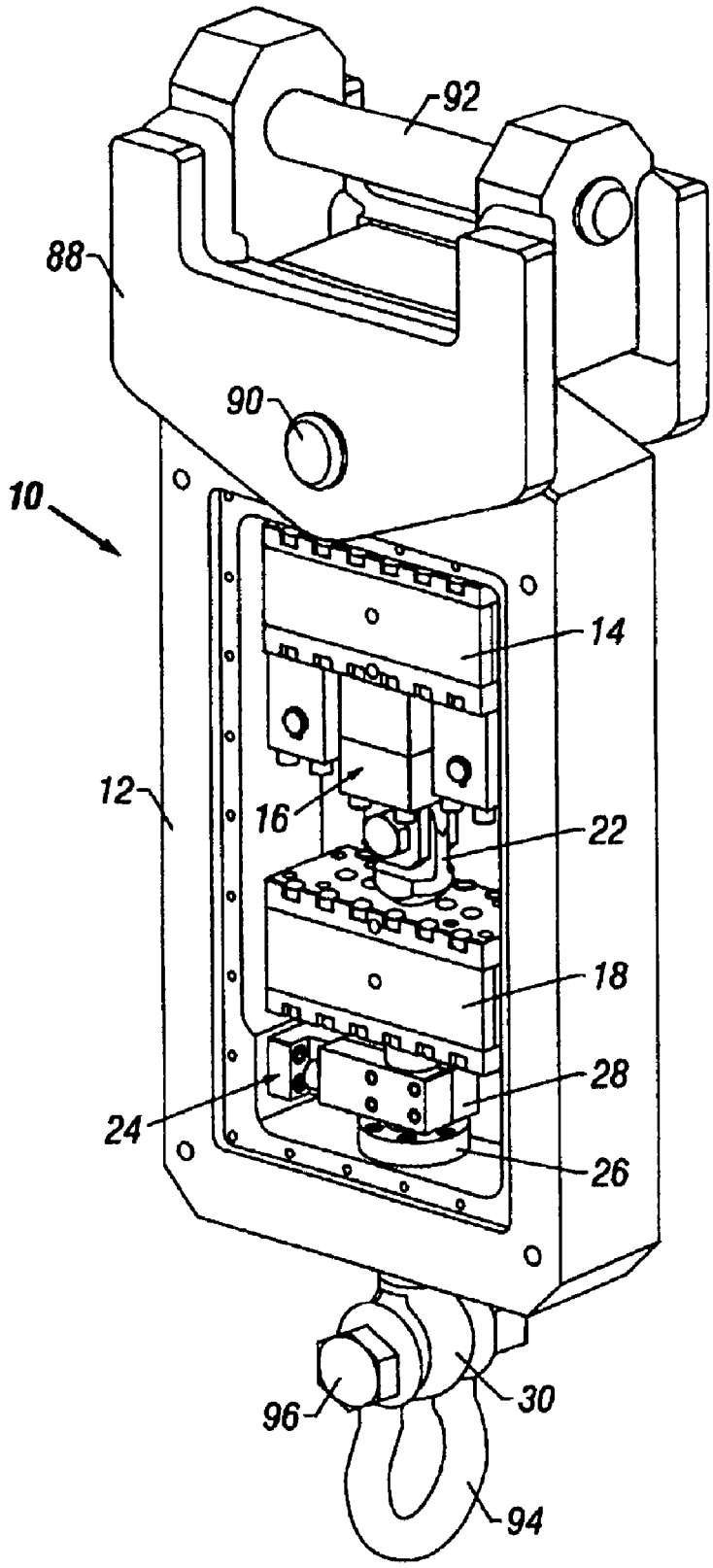
FIG. 5 is a front view of FIG. 4 including a two-axis tilt compensating support assembly and a load shackle.
Figure 6:
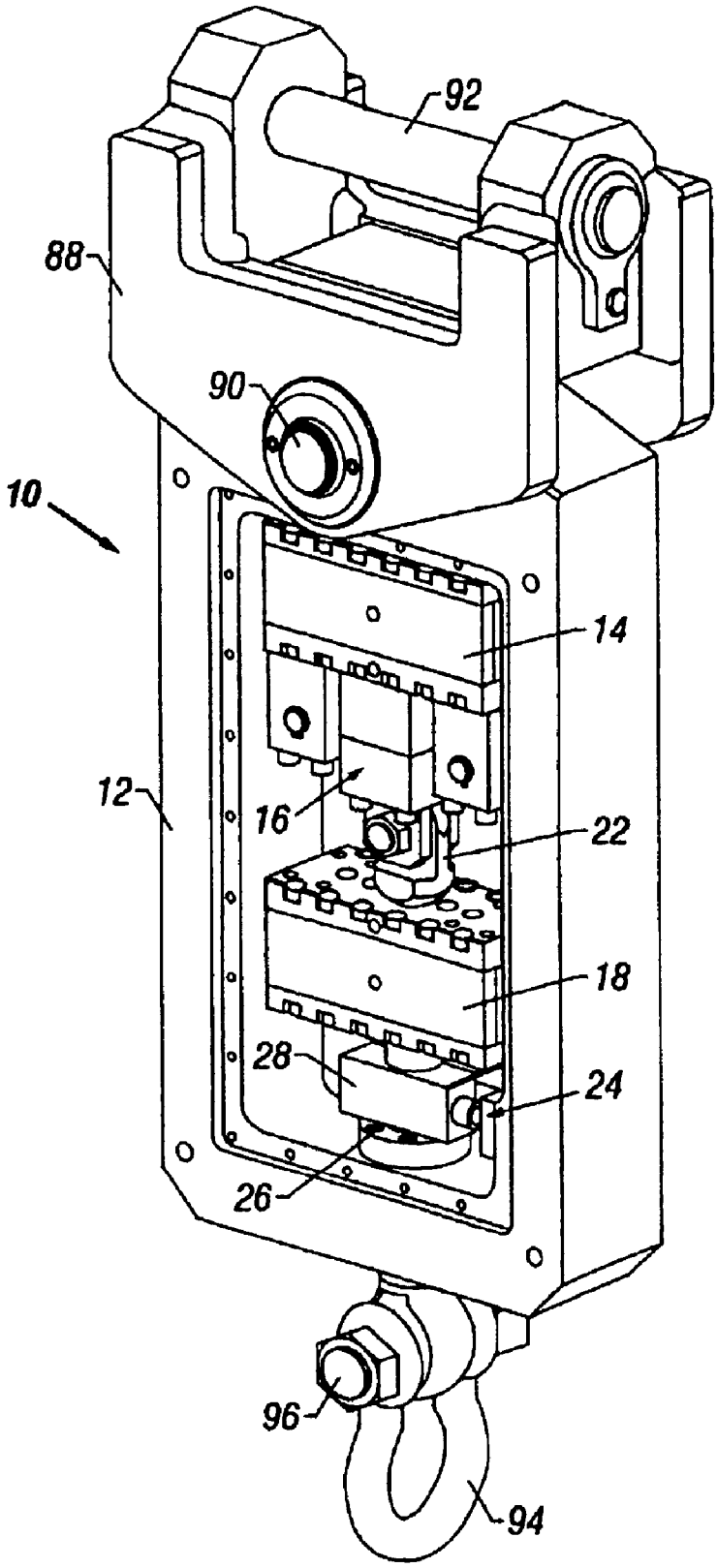
FIG. 6 is a back view of FIG. 5.

Referring now to FIGS. 5 and 6, FIG. 5 shows a front view and FIG. 6 is a back view of the major components of load cell system 10 further including two axis tilt compensating support assembly 88 connected to frame 12 by two axis support cross pin 90 through cross pin bearing 34 in frame 12. As is known in the art, stick pin 92 is utilized to connect two axis tilt compensating support assembly 88 to cranes (not shown).

FIGS. 5 and 6 also illustrate shackle 94 connected to drawbar 30 by bolt 96. Again, FIG. 5 is the front view and FIG. 6 is the back view.

Figure 7:
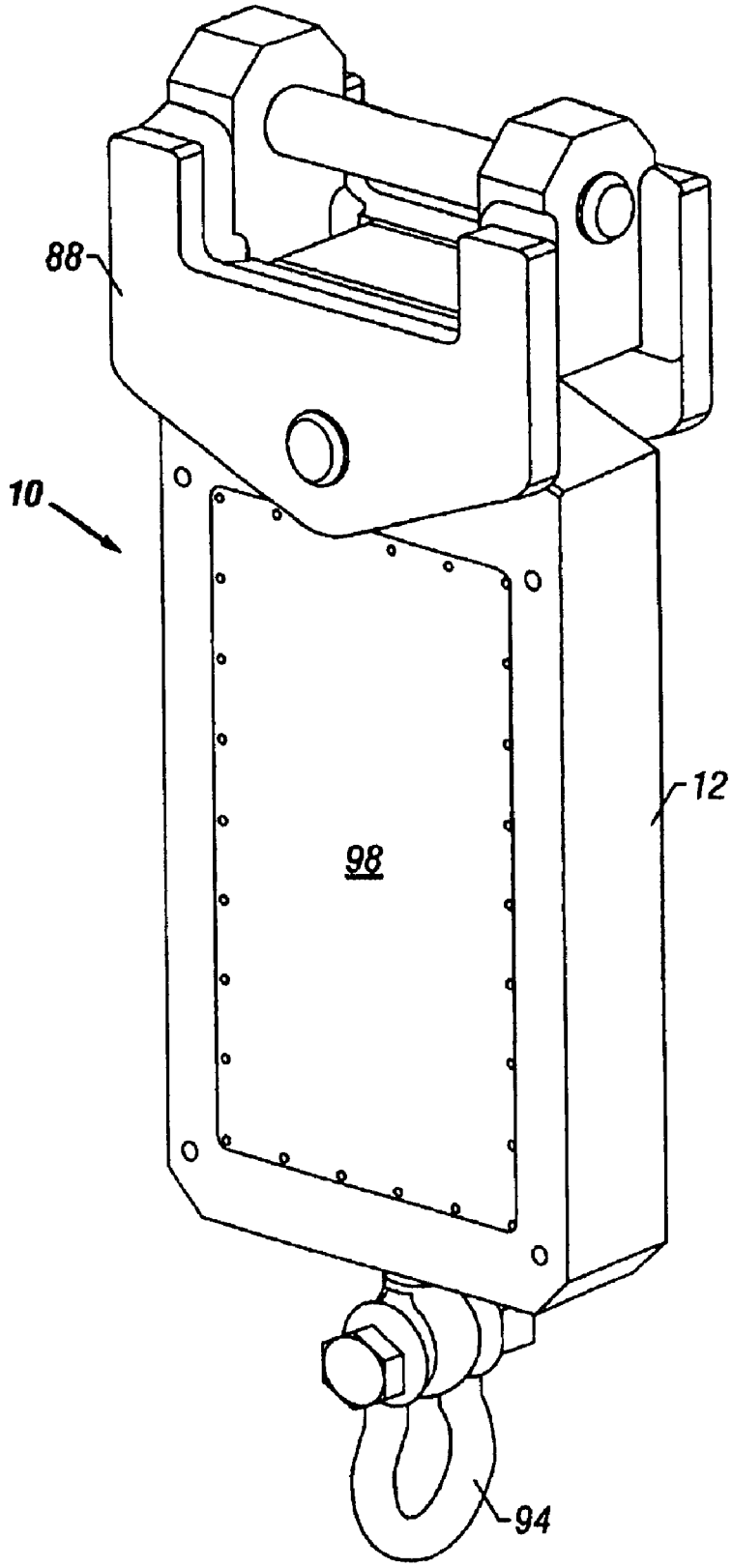
FIG. 7 is a front view of FIG. 5 with cover plate in place.
Figure 8:
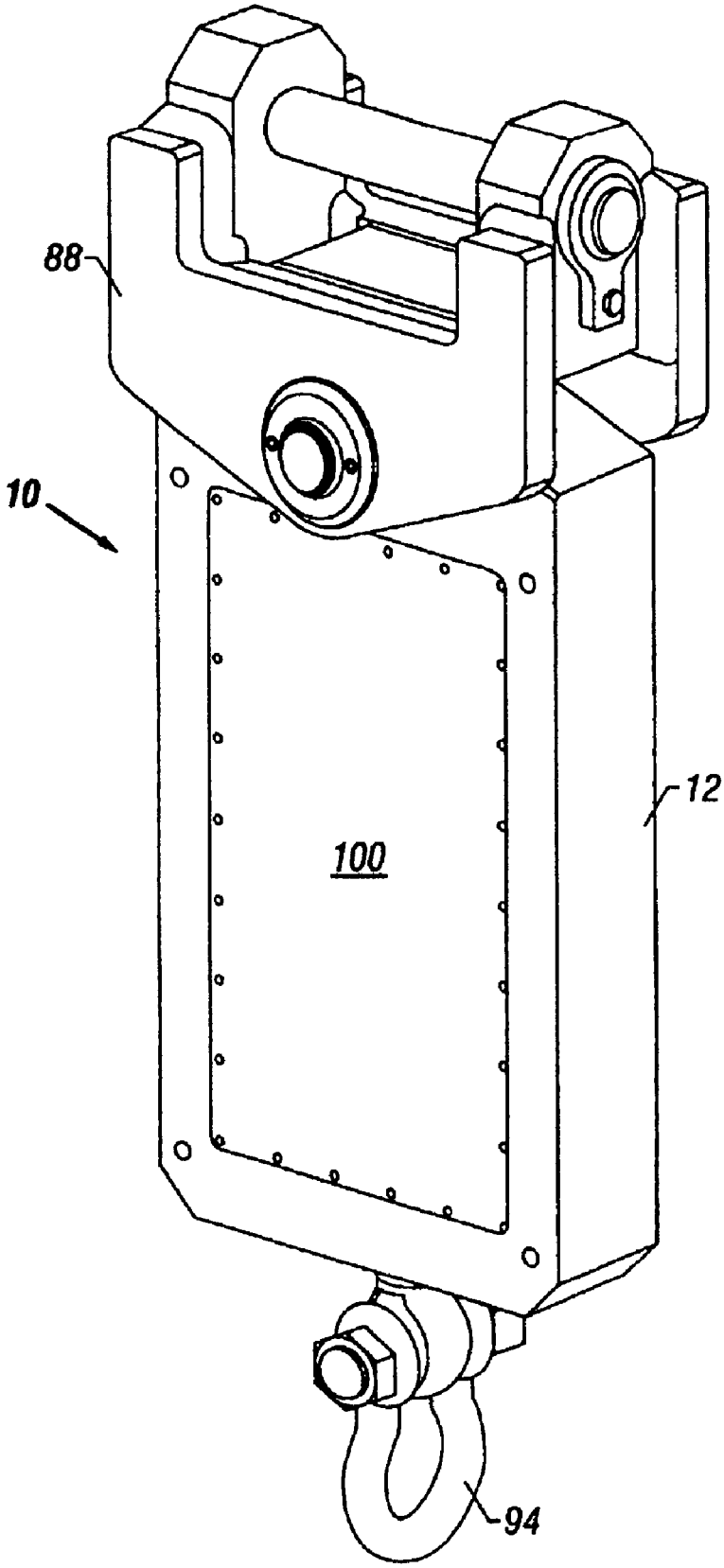
FIG. 8 is a back view of FIG. 5 with cover plate in place.

Referring now to FIGS. 7 and 8, FIG. 7 illustrates the load cell system 10 of the present invention with front cover plate 98, and back cover plate 100, respectively.

The operation of load cell system 10 of the present invention in a preferred embodiment includes the connection of the load cell system 10 to a crane for use in an industrial environment. In particular, the load cell system 10 of the present invention is extraordinarily useful and uniquely capable of performing useful service in the harshest of industrial environments such as the scrap metal industry. In that environment, a crane is attached to a grappling hook or a magnet, for example. The crane operator must vigorously slam the grappling hook or magnet into a tumbled mass of metal so as to ensure proper contact and a secure grip. Thus, in this harsh environment there is no gentle, careful placing of the crane magnet on the metal. Instead, again, it is slammed aggressively into the metal. Once the metal is secured, the crane operator typically vigorously yanks the metal upward and swings it rapidly to its destination such as a waiting freight car. A particular problem faced by the industry is the quick and accurate measurement of the amount of scrap metal so assembled. Historically, crane operators have been required to guess the approximate weights of various types of metals to be assembled, load them in a freight car, have the freight car weighed, and then add or subtract another estimated amount of metal to the freight car as required. A second and perhaps third or more weighings is necessary with the weighing systems of the present art.

By way of the load cell system 10 of the present invention, however, the operator may continuously know the exact total amount of various types of metals that have been picked up and delivered to a waiting freight car. In this embodiment, load cell system 10 is connected to a crane by means of stick pin 92, as illustrated, which is connected, in a preferred embodiment, to two-axis tilt compensative support assembly 88 which is, in turn, connected by two-axis support cross pin 90 to frame 12 of load cell system 10. The load cell 16 is connected, as previously discussed, by load cell output 64 to data transmission and receiving device 65. Data transmission and receiving device 65 may be any computer now known or hereafter developed or any computing device such as a laptop or other remote device. Further, load cell output 64 may be connected, as again previously discussed, by hardwire or remotely without hard wiring. Data transmission and receiving device 65 may be utilized to "zero" load cell 16 prior to operation and to receive and record load cell 16 data during a job. Data transmission and receiving device 65 may be located in the crane with the operator or remotely. Data transmission and receiving device 65 may, therefore, communicate not only directly with load cell 16 but also with the crane operator, if data transmission and receiving device 65 is not located in the crane. In this manner, a remote operator can coordinate a variety of load cell 16's throughout an area providing information to and receiving information for from various load cell 16's and to and from various crane operators.

Upper compliance assembly 14 and lower compliance assembly 18 operate substantially in the same manner. They are effective cushions against harsh shocks and both rebound and compressive loads and shield load cell 16 from the harsh motions associated in the industrial environment as previously described as the common use of cranes, for example. An important part of the compliance assemblies is the surrounding of load plate 40 in sandwich manner by a rebound pad 38 and a compression pad 40. In upper compliance assembly 14 in a preferred embodiment, both rebound and compression pads are comprised of a highly incompressible material such as manufactured by Fabreeka International, Inc., P.O. Box 210, 1023 Turnpike Street, Stoughton, Mass. 02072, www.fabreeka.com, and sold under the trade name FABREEKA brand pads.

In use, as previously mentioned, a crane operator typically will slam the crane with load cell system 10 attached roughly into a pile of scrap metal. In that instance, as illustrated in FIG. 2, the pad located directly above load plate 40 in upper compliance assembly 14 will serve as compression pad 44. Referring to the lower detail shown in FIG. 3, the reverse is true in that the compression pad 44 is located beneath load plate 40. Again, this reflects the nature of the industry wherein the load cell system 10 of the present invention will be initially propelled forcefully into a mass of materials to be picked up. Thereafter, in the normal circumstance, the operator quickly lifts the material forcefully upward. In that instance, compression pad 44 in lower compliance assembly 18 resists compression as the material is lifted. In each instance, the rebound pad 38 serves the required function of dampening the aggressive forces applied to load cell system 10 and prevent them from damaging load cell 16.

In a further embodiment, a moving overload limit 28 serves to allow load cell 16 to be stretched and compressed within a very narrow limit that does not overload load cell 16. Beyond that, in a preferred embodiment, fixed overload limit 26 is provided to assure that in the case of maximum forces being applied to load cell system 10 no damage occurs to load cell 16, as is a particularly recurrent problem in the prior art. These maximum forces outside the limits of load cell 16 are completely prevented from being transmitted to load cell 16 by the presence of fixed overload limit 26. Additionally, in a preferred embodiment, anti-rotation device 24 restricts the movement of load cell system 10 around vertical axis of rod end link 22, upper hanger stud 20, and drawbar 30, for example. Again, this is to insure that load cell 16 is never stressed beyond its operating limits either in torque, elongation or compression. In operation, the range of movement of drawbar 30 and moving overload limit 28 is in the nature of ¼ inch or 6.4 mm.

Load cell 16 can be of any type now known or hereafter developed so long as it is capable of being incorporated within load cell system 10. In a preferred embodiment, load cell 16 of any known design is encompassed by load cell loading saddle 54 comprised of upper load cell loading saddle 56 and lower load cell loading saddle 58. Once shielded and surrounded by load cell loading saddle 54, the load cell 16 is securely connected to a pair of load cell mounting yokes 52 which thereafter are connected to first base 36 of upper compliance assembly 14.

By way of the present invention, load cell system 10 provides the operator of heavy equipment, such as cranes and the like, heretofore unknown assurances of accuracy in weighing systems on the spot, at the moment of the use of the load cell system 10. Advantages of load cell system 10 are found in particular with upper compliance assembly 14 and lower compliance assembly 18. The compliance assemblies perform the function of a spring using commercially available organic elastomeric shock isolation pad material as previously discussed. The compliance assemblies include an oscillation damping function without the need for fluids or friction damping media. Damping, by way of load cell system 10 of the present invention, instead is by means of the hysteresis properties of the compression pad 44 and rebound pad 38 materials as previously discussed. These materials are cost efficient and require minimum maintenance due to lack of wear or breakage or need for lubrication. As a result, these materials provide for an extremely high spring rate in a very compact easily shielded package. Further, the load cell system 10 of the present invention provides for extremely high spring rates without concern for fatigue and wear as would be the case with other types of springs, such as Belville spring washers as they are known in the art.

Still further, the physical alignment of the compression pads 44 and rebound pads 38, load plate 40, and first base 36 and second base 46 by means of a pair of load plate loading pins 48 and a pair of base locating pins 50 are configured to pass through the elastomeric pads so as to provide positive electrical isolation of load cell 16 from the frame 12 and any connected crane boom. This structure provides isolation of the load cell 16 from disruptive electrical impulses and noise which are induced in these large structures. Further, a measure of protection from direct lightening strike on crane booms is also thereby provided.

A further advantage of load cell system 10 of the present invention relates directly to load cell 16. Load cell 16 is again, any commercially available, legal for trade load cell now known or hereafter developed. This commercial availability of the load cell enables it to be maintained on hand as a "field replaceable" component. In particular, a load cell manufactured by the Sensortronics company of Covina, Calif. 91722, www.sensortonics.com sold as Model number 65016 is suitable. This brand of load cell or any other load cell having like specifications is useful since it is a type of load cell commonly employed for tank and bin measurements. Characteristics of these load cells are well known and easily interfaced. Further, these types of load cells are "double-shear-beam" type load cells which are much more accurate and resistant to side load then strain-gage-on-rod or s-beam cells. Their reliability and certification has been previously determined by the Original Equipment Manufacturer ("OEM"). Nonetheless, certainly, any load cell 16 now known or hereafter developed that is suitable for the purposes described herein may be used.

Another major improvement of load cell system 10 of the present invention relates to the overload limits. Fixed overload limit 26 prevents overload of load cell 16 by limiting the movement of load cell 16 to a small physical motion of twenty to forty thousandths of an inch while, due to the action of compliance assemblies 14 and 18 moving overload limit 28 has a relatively large physical motion of approximately ¼ inch, in a preferred embodiment. The limit range of moving overload limit 28 to fixed overload limit 26 is field adjustable and is easy to adjust for varying application conditions. Adjustment does not require unusual or special tools. Additionally, the large area of impact, as shown in the drawings, keeps the unit load forces on fixed overload limit 26 and moving overload limit 28 low. As a compatible result, fatigue of materials and subsequent degradation of materials is minimized. Additionally, the overload limits of the present invention do not require close tolerances to manufacture and the stop settings are relatively free of temperature induced defects due to physical expansion/contraction of component materials.

Finally, drawbar 30 of load cell system 10 of the present invention provides advantages over the prior art in that no grease or oil is necessary for lubrication. Lubrication by grease or oil as is known in the prior art inevitably attracts dirt which finds its way into prior art bearings resulting in friction and wear. In Applicant's invention, the use of PTFE polymer composite bushings for drawbar bearing 32 results in a heavy shock tolerance and low friction with no lubricant required. The absence of lubricant results in minimum sealing requirements. As a result, nonspring-loaded seals may be employed to dry wipe drawbar 30. In a preferred embodiment drawbar 30 is coated with NEDOX brand plating material offered by General Magnaplate Corporation, 1331 Route 1, Linden, N.J. 07036.

These and other advantages of the present invention are obvious to persons of ordinary skill in the art and are not disclosed more fully hereafter. The multiple figures in the accompanying drawings are for illustrative purposes only and are not presented in any way to limit the scope of the invention. In that regard, while the load cell system 10 of the present invention has been disclosed in connection with heavy industrial environments, it should be appreciated that the load cell system 10 can be used with other weighing systems as well. Still further, while the present invention has been disclosed in connection with the preferred embodiments thereof, it should be understood that there may be other embodiments which fall within the spirit and scope of the invention as defined by the following claims.

What is claimed is:

1. A load cell apparatus comprising:

(a) a frame;

(b) [an upper] *at least one* compliance assembly connected to said frame *wherein said at least one compliance assembly further comprises a first base and a second base, a compression pad connected to said first base or said second base, a rebound pad, a load plate between said rebound pad and said compression pad, and said second base connected to said rebound pad or said compression pad*; and (c) a load cell connected to said [upper] *at least one* compliance assembly[; and].

[(d) a lower compliance assembly connected to said load cell.]

[2. The apparatus of claim 1 wherein said upper and lower compliance assemblies further comprise:

(a) a first base;

(b) a compression pad connected to said first or second base;

(c) a rebound pad;

(d) a load plate between said rebound pad and said compression pad; and (e) a second base connected to said rebound pad or said compression pad.]

3. The apparatus of claim 1 wherein said load cell further comprises:

(a) a load cell yoke connected to said upper assembly; and (b) an upper and lower loading saddle connected to said load cell.

4. The apparatus of claim 1 further comprising an overload limit.

5. The apparatus of claim 4 wherein said overload limit further comprises:

(a) a fixed overload limit; and (b) a moving overload limit.

6. The apparatus of claim 1 wherein said upper compliance assembly and said load cell are connected to each other and to said frame by a hanger stud.

7. The apparatus of claim 1 wherein said lower compliance assembly further comprises:

(a) a rod end link connected to said load cell; and (b) a drawbar connected to said rod end link.

8. The apparatus of claim 1 further comprising a rotation preventor.

9. The apparatus of claim 7 further comprising a rotation preventor connected to said drawbar.

10. The apparatus of claim 1 further comprising a data transfer means for providing data to the load cell and for receiving data from the load cell.

11. In a weighing system, a load cell method comprising the steps of:

(a) connecting a frame to the weighing system;

(b) connecting an upper compliance assembly to said frame;

(c) connecting a load cell to said upper compliance assembly; and (d) connecting a lower compliance assembly to said load cell.

12. The method of claim 11 further comprising the step of providing said upper and lower compliance assemblies with:

(a) a first base;

(b) a compression pad;

(c) a rebound pad;

(d) a load plate located between said rebound pad and said compression pad; and (e) a second base.

13. The method of claim 11 further comprising the steps of:

(a) connecting a load cell yoke to the upper assembly; and (b) connecting an upper and lower loading saddle to said load cell.

14. The method of claim 11 further comprising the step of connecting an overload limit.

15. The method of claim 14 wherein connecting said overload limit further comprises the steps of:

(a) providing a fixed overload limit; and (b) providing a moving overload limit.

16. The method of claim 11 further comprising the step of connecting said upper compliance assembly to said frame by a hanger stud.

17. The method of claim 11 further comprising the steps of:

(a) connecting a rod end link to said load cell; and (b) connecting a drawbar to said rod end link.

18. The method of claim 11 further comprising the step of adding a rotation preventor.

19. The method of claim 17 further comprising the step of connecting a rotation preventor to said drawbar.

20. The method of claim 11 further comprising the step of connecting a data transmission means to said load cell for transmitting and receiving data to and from said load cell.

* * * * *